United States Patent
Neumann et al.

(10) Patent No.: US 10,626,195 B2
(45) Date of Patent: Apr. 21, 2020

(54) POLYMERIZATION PROCESS WITH A PARTIAL SHUTDOWN PHASE

(71) Applicant: Basell Polyolefine GmbH, Wesseling (DE)

(72) Inventors: Erich Neumann, Braunschweig (DE); Sven Wolfram, Euskirchen (DE); Christoph Wolf, Pulheim-Dansweiler (DE); Juergen Mohrbutter, Alfter (DE); Dieter Littmann, Muecke (DE)

(73) Assignee: Basell Polyolefine GmbH, Wesseling (DE)

( * ) Notice: Subject to any disclaimer, the term of this patent is extended or adjusted under 35 U.S.C. 154(b) by 42 days.

(21) Appl. No.: 15/776,379

(22) PCT Filed: Nov. 16, 2016

(86) PCT No.: PCT/EP2016/077813
§ 371 (c)(1),
(2) Date: May 15, 2018

(87) PCT Pub. No.: WO2017/085097
PCT Pub. Date: May 26, 2017

(65) Prior Publication Data
US 2019/0338053 A1    Nov. 7, 2019

(30) Foreign Application Priority Data
Nov. 18, 2015 (EP) .................................. 15195082

(51) Int. Cl.
*C08F 2/00* (2006.01)
*C08F 10/02* (2006.01)
(Continued)

(52) U.S. Cl.
CPC .............. *C08F 2/01* (2013.01); *B01J 3/042* (2013.01); *B01J 19/242* (2013.01); *C08F 10/02* (2013.01);
(Continued)

(58) Field of Classification Search
CPC ....................................................... C08F 2/01
See application file for complete search history.

(56) References Cited

U.S. PATENT DOCUMENTS

| 3,634,375 A | 1/1972 | Wim Van Der Linde et al. |
| 4,804,725 A * | 2/1989 | Kanne ................... B01J 19/002 526/68 |

(Continued)

FOREIGN PATENT DOCUMENTS

| CN | 101094872 A | 12/2007 |
| CN | 101107273 A | 1/2008 |

(Continued)

OTHER PUBLICATIONS

The International Search Report and Written Opinion for PCT/EP2016/077813 dated Jan. 17, 2017.
(Continued)

*Primary Examiner* — Rip A Lee

(57) ABSTRACT

A process for polymerizing ethylene to obtain an ethylene-based polymer in a plant, wherein the plant includes a reactor in fluid communication with a recycle connection, wherein the process includes a polymerization phase, a partial shutdown phase, and the steps of reducing the pressure in the reactor for entering into the partial shutdown phase from the polymerization phase; and increasing the pressure in the reactor for exiting from the partial shutdown phase and re-entering the polymerization phase.

13 Claims, 3 Drawing Sheets

(51) Int. Cl.
*C08F 2/01* (2006.01)
*B01J 3/04* (2006.01)
*B01J 19/24* (2006.01)

(52) U.S. Cl.
CPC ............. *B01J 2219/00162* (2013.01); *B01J 2219/00164* (2013.01)

(56) References Cited

U.S. PATENT DOCUMENTS

| | | | |
|---|---|---|---|
| 6,384,153 | B2 | 5/2002 | Hammer et al. |
| 7,192,561 | B2 | 3/2007 | Groos et al. |
| 7,582,709 | B2 * | 9/2009 | Goossens ............. B01J 19/2415 526/64 |
| 7,582,723 | B2 | 9/2009 | Penzo et al. |
| 7,632,573 | B2 * | 12/2009 | Ohlsson ............... B01J 19/2415 428/522 |
| 7,745,550 | B2 | 6/2010 | Donck et al. |
| 7,837,950 | B2 | 11/2010 | Van Nuland et al. |
| 7,999,044 | B2 | 8/2011 | Hottovy et al. |
| 8,217,124 | B2 | 7/2012 | Littmann et al. |
| 8,598,283 | B2 | 12/2013 | Markel et al. |
| 9,637,568 | B2 | 5/2017 | Khayrullin et al. |
| 9,637,569 | B2 * | 5/2017 | Neumann ................ B01J 3/002 |
| 10,308,738 | B2 * | 6/2019 | Wolf ........................ C08F 2/04 |
| 2003/0206835 | A1 | 11/2003 | Donck |
| 2004/0247493 | A1 | 12/2004 | Donck |
| 2005/0037219 | A1 | 2/2005 | Ohlsson et al. |
| 2010/0087606 | A1 * | 4/2010 | Karjala ................... C08F 10/02 526/64 |
| 2013/0183200 | A1 | 7/2013 | Hottovy |
| 2015/0080533 | A1 | 3/2015 | Nguyen et al. |
| 2015/0203606 | A1 | 7/2015 | Cornelissen |
| 2018/0257055 | A1 * | 9/2018 | Cornelissen ........... B01J 19/002 |

FOREIGN PATENT DOCUMENTS

| | | |
|---|---|---|
| CN | 102892792 A | 1/2013 |
| DE | 1520227 A1 | 1/1970 |
| DE | 1745491 A1 | 9/1971 |
| DE | 152795 A1 | 12/1981 |
| EA | 200802250 A1 | 6/2009 |
| EP | 0272512 A2 | 6/1988 |
| EP | 1167396 A1 | 1/2002 |
| EP | 1589043 A2 | 10/2005 |
| GB | 1338280 A | 11/1973 |
| RU | 2518962 C2 | 6/2014 |
| RU | 2554881 C2 | 6/2015 |
| WO | 0201308 A2 | 1/2002 |
| WO | 2007018871 A1 | 2/2007 |
| WO | 2010027912 A1 | 3/2010 |
| WO | 2015082568 A1 | 6/2015 |
| WO | 2015091384 A1 | 6/2015 |

OTHER PUBLICATIONS

Dr. -Ing Archim Blok, Fire at Autoclave Reactor at B-Unit Reactor Bay in Borealis Oy Porvoo, Finland, 20th European LDPE Producers Safety Conference in Maastricht, Jun. 15, 2012, 23 pages.
Rudolf Eggers, Industrial High Pressure Applications, Processes, Equipment and Safety, Wiley-VCH Verlag GmbH & Co. KGaA, Germany, 2012, 424 pages.
William J. Zafian, KEMYA Reactor Vent, 20th European LDPE Producers Safety Conference, Jun. 15, 2012, 6 pages.
Ken Lawson, Reactor Guard Valve Leak, Sabic S18 Wilton UK, 21st European LDPE Producers Safety Conference, Ghent, May 2014, 11 pages.
European Commission, Reference Document on Best Available Techniques in the Production of Polymers, Aug. 2007, 314 pages.
Helmut Frischenschlager, Flüchtige Organische Verbindungen (VOC), Umweltbundesamt GmbH, Wien, Austria, 2010, 96 pages.
Ullmanns Encyclopedia, Polyolefins, Wiley-VCH Verlag GmbH & Co. KGaA, Weinheim, 2005, 103 pages.
Encyclopedia of Polymer Science and Engineering, vol. 6, Ethylene Polymers, John Wiley & Sons, Inc., 1985, 50 pages.
UHDE Engineering News 4-94, PE-LD and EVA-Copolymer Production Plants, The Advanced Ruhrchemie Process, 1994, 12 pages.
Adolf Echte, Handbuch der Technischen Polymerchemie, VCH Verlagsgesellschaft mbH, Weinheim, 1993, pp. 418-420.

* cited by examiner

POLYMERIZATION PROCESS WITH A PARTIAL SHUTDOWN PHASE

TECHNICAL FIELD

In general, the present disclosure relates to a polymerization process. More specifically, the present disclosure relates to a process for polymerization of ethylene homopolymers or copolymers. In particular, the present disclosure relates to a process for polymerization of ethylene homopolymers or copolymers, wherein the process includes a partial shutdown phase.

BACKGROUND OF THE INVENTION

In some instances, ethylene homopolymers and copolymers are used in durable and disposable goods, including molded parts and plastic films. Processes for polymerization of ethylene alone or with comonomers can yield ethylene homopolymers and copolymers.

A number of adverse conditions may arise that can affect the performance of a plant during the polymerization process. These conditions can lead to a total shutdown of the plant.

A need exists for improved polymerization processes that can avert a total shutdown of the plant. In particular, there is a need for polymerization processes which simultaneously complies with national or regional regulations and improves energy, material efficiency, or downtime.

BRIEF SUMMARY OF THE INVENTION

Embodiments of the present disclosure provide a process for polymerizing ethylene, and optionally one or more comonomers, to obtain an ethylene-based polymer in a plant having a polymerization reactor, a reactor inlet side, a reactor outlet side, a recycle connection, a product output, and a flow of fluid from the reactor outlet side into the recycle connection and from the recycle connection to the reactor inlet side, including the steps of:

i. reacting ethylene, and optionally one or more comonomers, to obtain the ethylene-based polymer at an operating pressure in the reactor $p_r^1$ and an operating pressure in the recycle connection $p_c^1$ during a polymerization phase;
ii. reducing the pressure in the reactor from the pressure of $p_r^1$ to a pressure of $p_r^2$ by increasing the flow rate of fluid from the reactor outlet side into the recycle connection, wherein the relation of $p_r^1$ and $p_r^2$ is $p_r^2 \leq 0.85 \ast p_r^1$ for entering into a partial shutdown phase; and
iii. increasing the pressure in the reactor from the pressure of $p_r^2$ to a pressure of $p_r^3$, wherein the relation of $p_r^2$ and $p_r^3$ is $p_r^3 \geq 1.1 \ast p_r^2$ for exiting from the partial shutdown phase and re-entering the polymerization phase, wherein (a) the polymerization reactor has a reactor inlet and a reactor outlet, (b) the reactor inlet side is located upstream of the reactor inlet, (c) the reactor outlet side is located downstream of the reactor outlet, and (d) the recycle connection has an inlet in fluid communication with the reactor outlet side of the plant and an outlet in fluid communication with the reactor inlet side of the plant. In some embodiments, the operating pressure $p_r^1$ in the reactor is in the range from about 100 to about 400 MPa.

In some embodiments, the operating pressure in the recycle connection $p_c^1$ is in the range from about 15 to about 50 MPa.

In some embodiments, the reducing step (ii) occurs in a time period of from about 5 seconds to about 15 minutes.

In some embodiments, the reducing step (ii) is initiated in response to an event selected from the group consisting of:
(a) a temperature in the plant exceeding a threshold value;
(b) a pressure in the plant exceeding a threshold value; and
(c) a malfunction of a component in the plant.

In some embodiments, the plant further includes:
(e) a valve, being located in the recycle connection, or in a component situated in fluid communication between the reactor outlet side and the inlet of the recycle connection, wherein the valve has a closed position and an open position; and
(f) a receiver for receiving fluid from the recycle connection through the valve when the valve is in the open position, and wherein the valve moves from the closed position to the open position as the pressure in the recycle connection exceeds a set pressure $p_c^2$, wherein the relation of $p_c^1$ and $p_c^2$ is $p_c^1 < p_c^2 \leq 1.5 \ast p_c^1$; and the valve moves from the open position to the closed position as the pressure in the recycle connection decreases below a reset pressure $p_c^3$, wherein the relation of $p_c^1$ and $p_c^3$ is $0.7 \ast p_c^1 < p_c^3 \leq p_c^1$.

In some embodiments, the receiver is a flare or a cracker or both.

In some embodiments, during the polymerization phase, ethylene is supplied to the plant with a flow rate $FR_E^1$ and, during the partial shutdown phase, ethylene is supplied to the plant with a flow rate $FR_E^2$, wherein the relation of $FR_E^1$ and $FR_E^2$ is $FR_E^2 \leq 0.1 \ast FR_E^1$.

In some embodiments, an initiator is fed into the reactor and wherein, during the polymerization phase, the initiator is fed with a flow rate $FR_{in}^1$; and, during the partial shutdown phase, the initiator is fed with a flow rate $FR_{in}^2$, wherein the relation of $FR_{in}^1$ and $FR_{in}^2$ is $FR_{in}^2 \leq 0.10 \ast FR_{in}^1$.

In some embodiments, the plant further includes:
(g) a compressor, being
  (g1) located in fluid communication between the outlet of the recycle connection and the reactor inlet and
  (g2) operated during the partial shutdown phase.

In some embodiments, the plant includes a product outlet valve, being located between the inlet side of the recycle connection and the product output of the plant, wherein the valve is more open during the polymerization phase than during the partial shutdown phase.

In a general embodiment, the present disclosure provides a process for the preparation of a downstream product including the preparation steps of:
(a) preparing an ethylene-based polymer; and
(b) treating the ethylene-based polymer to obtain the downstream product.

In some embodiments, the obtained ethylene-based polymer or the downstream product is converted into a shaped body.

In a general embodiment, the present disclosure provides a process and a plant for polymerization including the following components in fluid communication:
A. a reactor having a reactor inlet and a reactor outlet;
B. a recycle connection positioned in fluid communication between the reactor outlet and the reactor inlet; and
C. a valve, being located in fluid communication with (i) the recycle connection or (ii) a component situated between the reactor outlet and the inlet of the recycle connection, and in an open position provides fluid communication to a receiver; wherein the valve is configured to move to an open position as the pressure in the recycle connection exceeds a set pressure.

In some embodiments, the receiver is a flare or a cracker or both.

DESCRIPTION OF THE DRAWINGS

The following figures illustrate various embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

Figure 1:
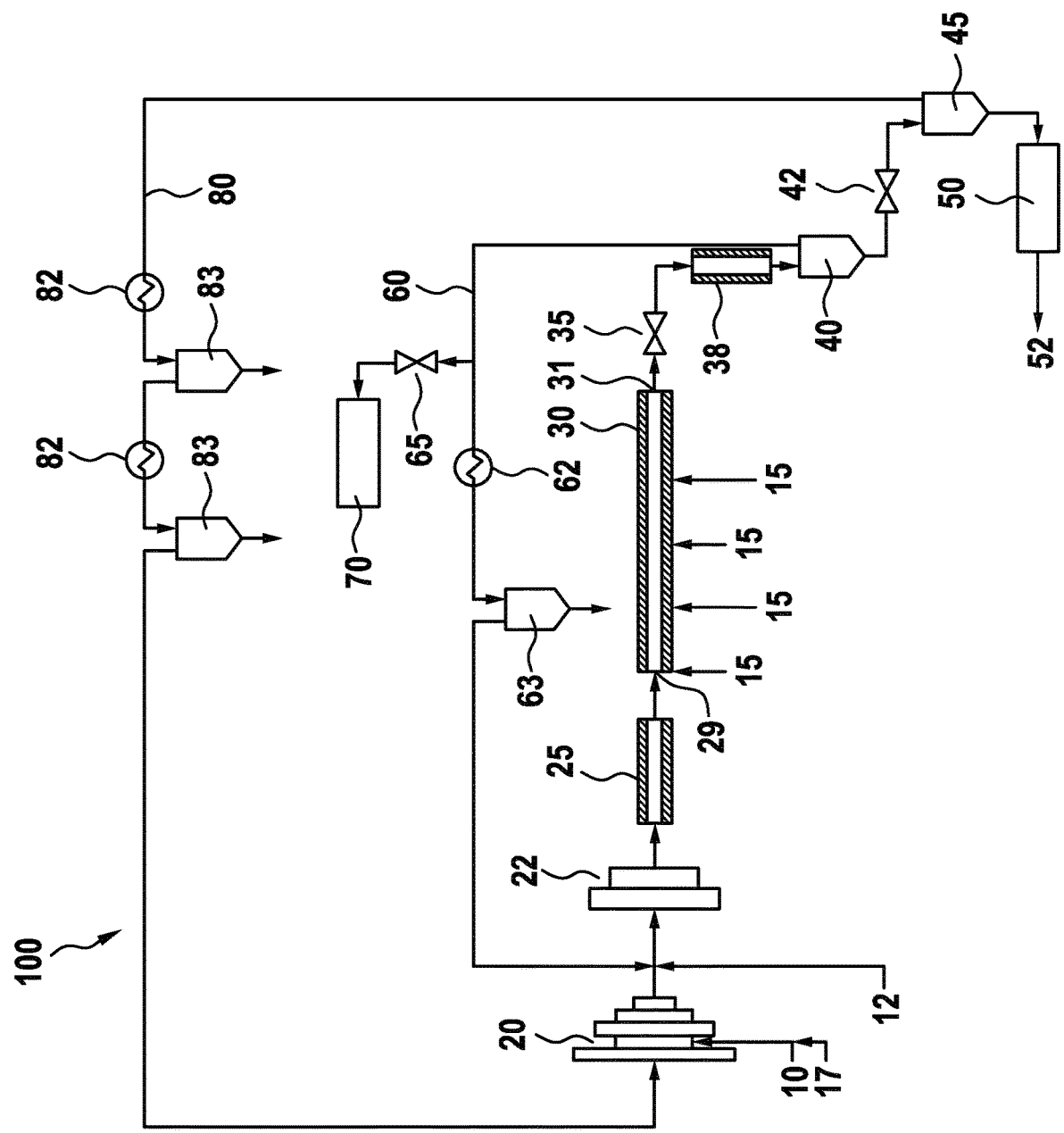
FIG. 1 is a schematic of a plant according to an embodiment of the present disclosure.

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include the modifications and alterations in so far as the modifications and alterations come within the scope of the appended claims or the equivalents thereof. In describing embodiments of the process for polymerizing ethylene in a plant, references to "process" or "plant" throughout the specification may be used interchangeably to describe the process or the physical plant employing the process.

As used in this specification and the claims, the singular forms "a," "an," and "the" include plural referents unless the context dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "α-olefin" or "alpha-olefin" means an olefin of formula $CH_2$=CH—R, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "vinyl" means a $C_2H_3$ moiety.

In the present description, the terms "monomer" and "comonomer" are used interchangeably. The terms mean any compound with a polymerizable moiety that is added to a reactor in order to produce a polymer. In those instances in which a polymer is described as including one or more monomers, for example, a polymer including propylene and ethylene, the polymer includes units derived from the monomers, for example, —$CH_2$—$CH_2$—, and not the monomer itself, for example, $CH_2$=$CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "ethylene-based polymer" is used herein broadly to include polymers such as polyethylene, ethylene-alpha olefin copolymers (EAO), and ethylene copolymers having at least 40 percent by weight of ethylene polymerized with the remaining amount of one or more comonomers such as vinyl acetate. Ethylene-based polymers can be made by a variety of processes including batch and continuous processes using single, staged, or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties.

In the present description, the term "fluid communication" refers to conveyance of a fluid between a first component and a second component. The fluid communication can occur directly or indirectly through one or more additional components. The term "direct fluid communication" refers to fluid communication that occurs directly between a first component and a second component. "Direct fluid communication" can include one or more trivial components, such as a joining tube or a valve located between the first component and the second component.

In the present description, the term "flow rate" refers to the conveyance of a quantity of a material during a specific period of time. The quantity can be measured based on volume or mass per time. The material can take various forms, including solids, liquids, and gases. In some instances, the flow of certain materials is measured in mass per unit of time, for example as kg/s (kilograms per second) or as t/h (tons per hour). One or more different flow rates may be applied to the various phases of the process, which levels may be designated by ordinals such as $FR^1$, $FR^2$, $FR^3$, etc. and material may be designated by subscripts such as $FR_a$, $FR_b$, $FR_c$, etc. Such material-related flow rate designations include $FR_E$ for a flow rate of ethylene and $FR_{in}$ for a flow rate of initiator.

In the present description, the term "kick" refers to a burst of increased fluid flow.

In the present description, the term "inlet" refers to an access point at which fluid enters a component. The term "inlet" is more fully defined by the direction of the fluid's flow, including the direction of flow during the component's routine operation, designed performance, or primary function.

In the present description, the term "reactor inlet" refers to the opening of the polymerization reactor through which a majority of the reactants, expressed as mass, is introduced into the reactor.

In the present description, the term "outlet" refers to an egress point at which fluid exits a component. The term "outlet" is more fully defined by the direction of the fluid's flow, including the direction of flow during the component's routine operation, designed performance, or primary function.

In the present description, the term "reactor outlet" refers to the opening of the polymerization reactor through which a majority of the reaction mixture within the polymerization reactor, expressed as mass, is discharged.

In the present description, the term "partial shutdown phase" refers to a phase during which the pressure in the reactor is reduced and the polymerization reaction in the reactor is slowed or ceased. A partial shutdown may be used to avert a full shutdown, where the cause may be certain malfunctions of the plant, maintenance activities or precautionary safety measures.

In the present description, the term "pressure" refers to the force applied perpendicular to the surface of an object per unit area over which the force is distributed and may be measured in units such as MPa. Herein, the polymerization processes utilize various types of equipment. One or more different pressure levels may be applied to the various types of equipment, which levels may be designated by ordinals such as $P^1$, $P^2$, $P^3$, etc. and equipment may be designated by subscripts such as $P_a$, $P_b$, $P_c$, etc. Such equipment-related pressure designations include $p_r$ for a pressure in the polymerization reactor and $p_c$ for a pressure in the recycle connection.

"Weight Average Molecular Weight" is measured by GPC (Gel Permeation Chromatography) on a Waters 150 gel permeation chromatograph equipped with a differential refractive index (DRI) detector and Chromatix KMX-6 on line light scattering photometer. The system is used at 135° C. with 1,2,4-trichlorobenzene as the mobile phase. Shodex (Showa Denko America, Inc.) polystyrene gel columns 802, 803, 804 and 805 are used. This technique is discussed in "Liquid Chromatography of Polymers and Related Materials III", J. Cazes, editor, Marcel Dekker, 1981, p. 207. No corrections for column spreading are employed. Weight average molecular weight is calculated from elution times. The numerical analyses are performed using the commercially available Beckman/CIS customized LALLS software in conjunction with the standard Gel Permeation package.

In a general embodiment, the present disclosure provides a process for polymerizing ethylene, and optionally one or more comonomers, to obtain an ethylene-based polymer in a plant having a polymerization reactor, a reactor inlet side, a reactor outlet side, a recycle connection, a product output, and a flow of fluid from the reactor outlet side into the recycle connection and from the recycle connection to the reactor inlet, including the steps of:

i. reacting ethylene, and optionally one or more comonomers, to obtain the ethylene-based polymer at an operating pressure in the reactor $p_r^1$ and an operating pressure in the recycle connection $p_c^1$ during a polymerization phase, ii. reducing the pressure in the reactor from the pressure of $p_r^1$ to a pressure of $p_r^2$ by increasing the flow rate of fluid from the reactor outlet side of the plant into the recycle connection, wherein the relation of $p_r^1$ and $p_r^2$ is $p_r^2 \leq 0.85 \ast p_r^1$ for entering into a partial shutdown phase; and iii. increasing the pressure in the reactor from the pressure of $p_r^2$ to a pressure of $p_r^3$, wherein the relation of $p_r^2$ and $p_r^3$ is $p_r^3 \geq 1.1 \ast p_r^2$ for exiting from the partial shutdown phase and re-entering the polymerization phase, wherein (a) the polymerization reactor has a reactor inlet and a reactor outlet, (b) the reactor inlet side is located upstream of the reactor inlet, (c) the reactor outlet side is located downstream of the reactor outlet, and (d) the recycle connection has an inlet in fluid communication with the reactor outlet side of the plant and an outlet in fluid communication with the reactor inlet side of the plant.

The process for polymerization of ethylene to obtain an ethylene-based polymer can yield polyethylene homopolymers or copolymers depending on the reactants. In some embodiments, the polymer product is a polyethylene homopolymer, a polyethylene copolymer, or a derivative thereof.

In some embodiments, the ethylene-based polymers include ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), medium-density polyethylene (MDPE), linear low-density polyethylene (LLDPE), low-density polyethylene (LDPE), very-low-density polyethylene (VLDPE), and chlorinated polyethylene (CPE). In some embodiments, the ethylene-based polymers are one or more selected from the group consisting of high-density polyethylene (HDPE), linear low-density polyethylene (LLDPE), and low-density polyethylene (LDPE). In some embodiments, the ethylene-based polymer is low-density polyethylene (LDPE).

In some embodiments, the ethylene-based polymer has a weight average molecular weight determined by GPC with a light scattering detector in the range from about 500 to about 5,000,000 g/mol, alternatively in the range from about 750 to about 1,000,000 g/mol, alternatively in the range from about 1000 to about 500,000 g/mol.

In some embodiments, the ethylene-based polymer has a density in the range from about 0.89 to about 0.96 g/cm$^3$, alternatively in the range from about 0.90 to about 0.95 g/cm$^3$, alternatively in the range from about 0.91 to about 0.94 g/cm$^3$.

In some embodiments, the reaction process involves reacting ethylene with one or more comonomers.

In some embodiments, the polyethylene copolymers are selected from the group consisting of ordered polymers, partially ordered polymers and non-ordered polymers. In some embodiments, the content of non-ethylene comonomer units is in the range from about 0.0001 to about 60 wt. %, alternatively in the range from about 0.001 to about 50 wt. %, alternatively in the range from about 0.01 to about 40 wt. %, based on the total weight of the copolymer.

In some embodiments, comonomers are selected from the group consisting of an α,β-unsaturated carboxylic acid, esters of an α,β-unsaturated carboxylic acid, anhydrides of an α,β-unsaturated carboxylic acid, and olefins. In some embodiments, the olefins are 1-olefins. In some embodiments, the olefins are selected from the group consisting of: propene, 1-butene, 1-pentene, 1-hexene, 1-octene, and 1-decene. In some embodiments, the α,β-unsaturated carboxylic acids are $C_3$-$C_8$ α,β-unsaturated carboxylic acids. In some embodiments, the α,β-unsaturated carboxylic acids are selected from the group consisting of: maleic acid, fumaric acid, itaconic acid, acrylic acid, methacrylic acid and crotonic acid, or derivatives of one or more thereof. In some embodiments, the esters of α,β-unsaturated carboxylic acids or the anhydrides of an α,β-unsaturated carboxylic acid are derived from $C_3$-$C_8$ carboxylic acids. In some embodiments, the esters or anhydrides are made from or contain from 3 to 13 carbon atoms. In some embodiments, the α,β-esters are selected from the group consisting of: methyl methacrylate, ethyl methacrylate, n-butyl methacrylate or tert-butyl methacrylate, methyl acrylate, ethyl acrylate, n-butyl acrylate, 2-ethylhexyl acrylate and tert-butyl acrylate. In some embodiments, carboxylate anions are comonomers. In some embodiments, the carboxylate anions are vinyl acetate. In some embodiments, the anhydrides are selected from the group consisting of: methacrylic anhydride, maleic anhydride and itaconic anhydride.

In some embodiments, the comonomer is selected from the group consisting of: 1-hexene, acrylic acid, n-butyl acrylate, tert-butyl acrylate, 2-ethylhexyl acrylate, vinyl acetate and vinyl propionate.

In some embodiments, a vinyl silane is a comonomer. In some embodiments, the vinyl silane is made from or contains silicon and a vinyl group. In some embodiments, the vinyl silanes are selected from the group consisting of vinyltrimethoxysilane and vinyltriethoxysilane.

In some embodiments, the polymerization process involves an initiator or a catalyst. In some embodiments, the initiator is selected from the group consisting of radical initiators, coordinative initiators, or mixture of two or more of these compounds.

In some embodiments, radical initiators are substances that can produce radical species under the conditions in the polymerization reactor. In some embodiments, radical initiators are selected from the group consisting of oxygen, air, azo compounds and peroxidic polymerization initiators. In some embodiments, the polymerizations is carried out by using oxygen, either fed in the form of pure $O_2$ or as air. In some embodiments, initiation involves using organic peroxides or azo compounds. In some embodiments, C—C initiators, including azoalkanes (diazenes), azodicarboxylic esters, azodicarboxylic dinitriles and hydrocarbons which decompose into free radicals, are used. In some embodiments, individual initiators or mixtures of various initiators are used. In some embodiments, commercially-available compounds are used as initiators, including peroxides from Akzo Nobel offered under the trade names Trigonox® or Perkadox®.

In some embodiments, peroxidic polymerization initiators include 1,1-di(tert-butyl-peroxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne. In some embodiments, the peroxidic polymerization initiator is selected from the group consisting of tert-butyl peroxy-3,5,5-trimethylhexanoate, di-(2-ethylhexyl)peroxydicarbonate and tert-butyl peroxy-2-ethylhexanoate.

In some embodiments, coordinative initiators are made from or contain a variable oxidation state metal. In some embodiments, the metal is a transition metal, a p block metal, a lanthanide, or an actinide. In some embodiments, the coordinative initiator is a transition metal selected from the group consisting of Ti, Zr, Hf, V, Mo, Cr, W, and In. In some embodiments, the coordinative initiators are based on the metals as ligands with a halogen or an organic moiety. In some embodiments, the process contains coordinative initiators and cocatalysts. In some embodiments, a cocatalyst is an alkyl aluminum or a derivative thereof.

In some embodiments, the plant is used for the polymerization of ethylene, and optionally one or more comonomers, to obtain an ethylene-based polymer. The plant includes a polymerization reactor, in which the actual conversion of ethylene and the optional one or more comonomers to the ethylene-based polymer occurs, and additional components. In some embodiments, the additional components include apparatuses for conveying reactants to the reactor such as compressors or pumps, heat-exchangers such as coolers or heater, or apparatuses for the work-up of the obtained polymer such as separators or pelletizer.

The polymerization reactor has a reactor inlet and a reactor outlet. The reactor inlet is the opening of the polymerization reactor through which a majority of the reactants, expressed as mass, is introduced into the reactor. In some embodiments, a majority of ethylene and the optional one or more comonomers are introduced through the reactor inlet into the polymerization reactor. The reactor outlet is the opening of the polymerization reactor through which a majority of the reaction mixture within the polymerization reactor, expressed as mass, is discharged. In some embodiments, a majority of the obtained ethylene-based polymer is discharged from the polymerization reactor through the reactor outlet. In some embodiments, the entire obtained ethylene-based polymer is discharged from the polymerization reactor through the reactor outlet.

In some embodiments, the plant is logically divided in a polymerization reactor; a reactor inlet side of the plant, which is located, with respect to the majority of the reactants introduced into the reactor, upstream of the reactor inlet; and a reactor outlet side, which is located, with respect to the majority of the reaction mixture discharged from the polymerization reactor, downstream of the reactor outlet. In addition, the plant includes at least one recycle connection for returning fluid, which has passed the polymerization reactor to the polymerization. This recycle connection provides a fluid communication from the reactor outlet side of the plant to the reactor inlet side of the plant.

In some embodiments, besides the inlet reactor and the reactor outlet, the polymerization reactor has openings through which fluids such as ethylene, comonomer or initiator can flow. In some embodiments, the flow of the fluids is controlled. In some embodiments, the flow is controlled by one or more valves.

In some embodiments, the reactor is a tubular reactor. In some embodiments, the reactor has a minimum flow distance between its inlet and its outlet of at least about 100 m, alternatively at least about 500 m, alternatively at least about 1 km, alternatively at least about 2 km. In some embodiments, the reactor has a site at which a material can be introduced into the reactor. In some embodiments, the material is an initiator.

In some embodiments, the reactor is of the autoclave type. In some embodiments, a stirrer is included within the reactor. In some embodiments, the minimum flow distance between the input and output is in the range from about 1 to about 50 m, alternatively in the range from about 3 to about 30 m, alternatively in the range from about 5 to about 20 m.

In some embodiments, the plant includes compressors which increase the pressure of a fluid in the plant.

In some embodiments, the compression of the fluid is carried out by a combination of a primary compressor and a secondary compressor. In some embodiments, the primary compressor first compresses the fluid to a pressure of from about 10 MPa to about 50 MPa and the secondary compressor further compresses the fluid to the operating pressure $p_r^1$. In some embodiments, the primary compressor and the secondary compressor are multistage compressors. In some embodiments, the compressors are separated into one or more stages and the stages are divided into separated compressors. In some embodiments, a series of one primary compressor and one secondary compressor is used for compressing the fluid to the operating pressure $p_r^1$. In some embodiments, the whole primary compressor is designated as primary compressor. In some embodiments, the one or more first stages of the primary compressor, which compress the recycle gas from the low-pressure product separator to the pressure of the fresh ethylene feed, are designated as a booster compressor and then the subsequent stages are designated as a primary compressor even though the booster compressor and the subsequent stages are part of one apparatus. In some instances, the secondary compressor is alternatively identified as a hyper compressor. In some embodiments, the capacity of the secondary compressor, that means the feed rate of compressed fluid from the compressor combination to the reactor, is from about 60 t/h to about 210 t/h, alternatively from about 100 t/h to about 180 t/h, alternatively from about 120 t/h to about 160 t/h.

In some embodiments, the plant includes separators for separating the fluid flow into two or more constituents. In some embodiments, the constituents are selected from the group consisting of: reactant, product, impurity, by-product and catalyst. In some embodiments, the plant includes a separator, which is preceded by a cooling channel. In some embodiments, the separator is directly preceded by a cooling channel. In some embodiments, the constituents are in different phases. In some embodiments, the different phases are selected from a gas, a liquid, a solid, a hypercritical fluid and a meta-phase.

The plant further includes a recycle connection which is positioned in fluid communication between the reactor outlet and the reactor inlet for returning fluid, which has passed the polymerization reactor to the polymerization. The recycle connection has an inlet in fluid communication with the reactor outlet side of the plant and an outlet in fluid communication with the reactor inlet side of the plant and has a flow of fluid from the reactor outlet side of the plant into the recycle connection and from the recycle connection to the reactor inlet side of the plant. In some embodiments, the fluid is cooled by passing through the recycle connection. In some embodiments, the fluid is cooled to an extent which allows re-introduction into the compressor.

In some embodiments, the temperature drop in the fluid on passing through the recycle connection is in the range from about 50 to about 300 K, alternatively in the range from about 180 to about 290, alternatively in the range from about 200 to about 260 K. In some embodiments, the fluid enters the recycle connection at a temperature in the range from about 100 to about 380° C., alternatively in the range from about 150 to about 350° C., alternatively in the range from about 200 to about 300° C. In some embodiments, the fluid exits the recycle connection at a temperature in the range from about 20 to about 80° C., alternatively in the range from about 30 to about 60° C., alternatively in the range from about 35 to about 55° C.

In some embodiments, the fluid passes through two or more coolers in the recycle connection. In some embodiments, the temperature of the fluid is reduced by from about 20 to about 150 K, alternatively from about 25 to about 130 K, alternatively from about 35 to about 110 K, in the first of the two or more coolers. In some embodiments, the temperature of the fluid is reduced by from about 20 to about 150 K, alternatively from about 25 to about 130 K, alternatively from about 35 to about 110 K in the second of the two or more coolers.

In some embodiments, the recycle connection allows the content of one or more products/side-products in the fluid to be reduced. In the some embodiments, the products or side-products are waxy. In some embodiments, the recycle connection decreases the wt. % of one or more products/side-products in the fluid flow by at least about 0.01 wt. %, alternatively by at least about 0.05 wt. %, alternatively by at least about 0.1 wt. %, this decrease in wt. % being expressed as the wt. % in the input minus the wt. % in the output. In the some embodiments, the products or side-products are waxy.

The fluid communication between the reactor outlet and the inlet of the recycle connection may be direct or indirect. In some embodiments, the fluid communication is indirect. In some embodiments, the fluid communication is via one or more components selected from a cooler, a separator and a pressure let down.

In some embodiments, the plant includes a high pressure recycle connection, which is operated with fluid at a pressure $p_c^1$ in the range from about 15 to about 50 MPa, alternatively in the range from about 20 to about 40 MPa, alternatively in the range from about 25 to about 35 MPa.

In some embodiments, the plant includes a low pressure recycle connection, which is operated with fluid at a pressure in the range from about 0.01 to about 20 MPa, alternatively in the range from about 0.05 to about 10 MPa, alternatively in the range from about 0.1 to about 5 MPa.

In some embodiments, the plant includes one or more recycle connections exhibiting a low pressure drop between inlet and outlet. In some embodiments, the pressure difference is less than about 50 MPa, alternatively less than about 20 MPa, alternatively less than about 5 MPa. In some embodiments, the plant includes a high pressure recycle connection exhibiting a low pressure drop between inlet and outlet.

In some embodiments, the plant contains additional components, such as heat exchangers and pressure let down valves.

In some embodiments, the polymerization is carried out at a temperature in the range from about 100 to about 380° C., alternatively in the range from about 130 to about 365° C., alternatively in the range from about 150 to about 350° C.

In some embodiments, the polymerization is carried out at an operating pressure in the reactor $p_r^1$ of from about 100 to about 400 MPa. In some embodiments, the operating pressure in the reactor $p_r^1$ is in the range from about 125 to about 350 MPa, alternatively in the range from about 150 to about 325 MPa.

The process includes a partial shutdown phase. A partial shutdown can be employed as an alternative to a full shutdown and depressurization of the reactor into the environment when the cause of the shutdown does not render full shutdown of the plant necessary. A partial shutdown can avoid reduced energy efficiency, wastage of materials, plant downtime, and environmental contamination. In some embodiments, a partial shutdown permits the plant to return quicker to an operating polymerization phase than a full shutdown with less or no cleaning of the reactor than following a full shutdown.

To enter a partial shutdown phase, the pressure in the reactor $p_r^1$ is reduced to a pressure of $p_r^2$ by increasing the flow rate of fluid from the reactor into a recycle connection. In some embodiments, the recycle connection is a high pressure recycle connection. The relation of the operating pressure in the reactor $p_r^1$ and the pressure in the reactor during the partial shutdown phase $p_r^2$ is $p_r^2 \leq 0.85*p_r^1$, alternatively $p_r^2 \leq 0.80*p_r^1$, alternatively $p_r^2 \leq 0.75*p_r^1$.

In some embodiments, the reducing step (ii) for reducing the pressure in the reactor from $p_r^1$ to $p_r^2$ occurs in a time period of from about 5 seconds to about 15 minutes, alternatively of from about 1 to about 10 minutes, alternatively of from about 3 to about 7 minutes.

Figure 4:
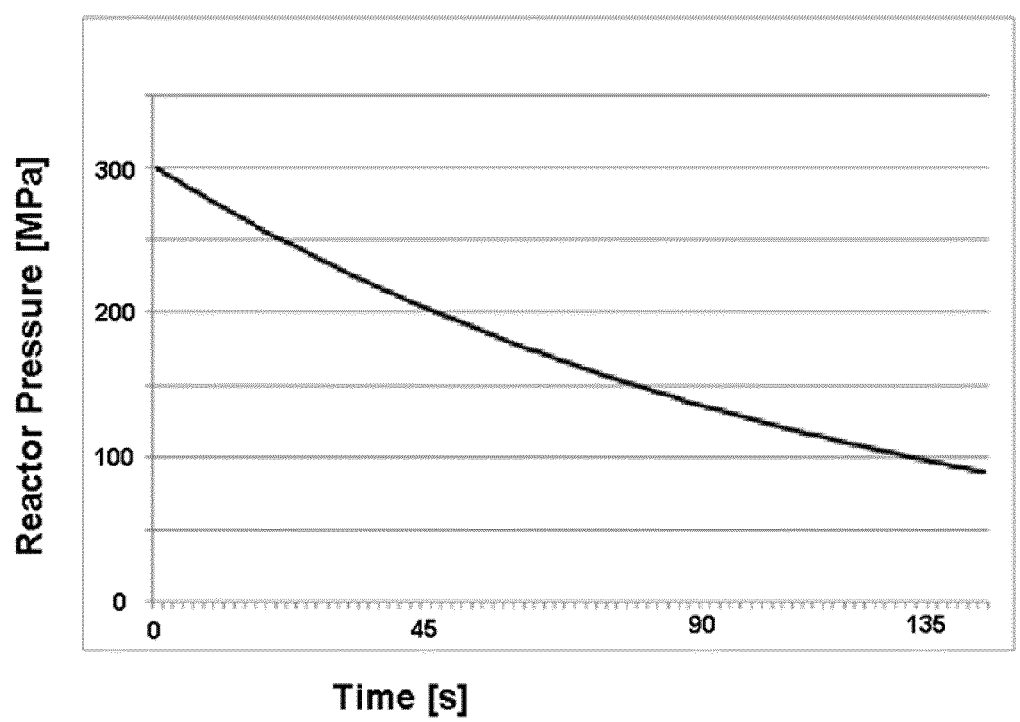
FIG. 4 is a graph of an embodiment of the pressure in the reactor as the reactor enters a partial shutdown phase.

FIG. 4 is a graph of the pressure in the reactor as the reactor enters a partial shutdown phase. FIG. 4 shows depressurization to the partial shutdown phase, from a reactor pressure of $p_r^1$ of about 300 MPa to a reactor's reduced pressure of $p_r^2$ of about 200 MPa in about 45 seconds.

In some embodiments, the increased flow of fluid from the reactor into the recycle connection to enter the partial shutdown phase is not constant. In some embodiments, the increased flows consists of bursts of increased fluid flow (otherwise called as "kicks"). In some embodiments, kicks are employed during the operational polymerization phase and kicks are continued to be employed when entering into the shutdown phase. In some embodiments, the pressure drop in the reactor, while entering the partial shutdown phase, is augmented by increasing the amplitude of the kicks, increasing the frequency of the kicks, or both.

In some embodiments, entry into the partial shutdown phase is initiated in response to an event such as:
(a) a temperature measured in the plant being beyond a threshold value;
(b) a pressure measured in the plant being beyond a threshold value; and
(c) a component of the plant malfunctioning. In some embodiments, the temperature exceeds a threshold value. In some embodiments, the temperature increase occurs in the reactor. In some embodiments, the pressure exceeds a threshold value. In some embodiments, the pressure increase occurs in the reactor.

In some embodiments, the recycle connection or a component situated in fluid communication between the outlet side of the reactor and the inlet of the recycle connection, into which the reactor is depressurized, includes a valve having a closed position and an open position and the valve provides fluid communication with a receiver for receiving fluid from the recycle connection through the valve when the valve is in the open position. The valve moves from the closed position to the open position as the pressure in the recycle connection exceeds a set pressure $p_c^2$, wherein the relation of $p_c^1$ and $p_c^2$ is $p_c^1 < p_c^2 \leq 1.5*p_c^1$; alternatively $p_c^1 < p_c^2 \leq 1.3*p_c^1$; alternatively $p_c^1 < p_c^2 \leq 1.2*p_c$. The valve moves from the open position to the closed position as the pressure in the recycle connection decreases below a reset pressure $p_c^3$, wherein the relation of $p_c^1$ and $p_c^3$ is $0.7*p_c^1 < p_c^3 \leq p_c^1$; alternatively $0.75*p_c^1 < p_c^3 \leq p_c^1$; alternatively $0.8*p_c^1 < p_c^3 \leq p_c^1$. In some embodiments, the valve opens at a pressure in the range from about 25 to about 35 MPa, alternatively in the range from about 26 to about 32 MPa, alternatively in the range from about 27 to about 31 MPa. In some embodiments, the valve closes at a pressure in the range from about 18 to about 30 MPa, alternatively the range from about 20 to about 28 MPa, alternatively in the range from about 22 to about 25 MPa.

In some embodiments, the receiver for receiving fluid from the recycle connection is a flare, a cracker, or both. In some embodiments, the flares are combustion of material. In some embodiments, the material is a fluid. In some embodiments, the plant includes one or more flares. In some embodiments, the crackers are for obtaining ethylene from a hydrocarbon. In some embodiments, the crackers break a carbon-carbon bond to obtain ethylene. In some embodiments, the cracker is an ethylene-plant including an ethylene-plant unit for converting a hydrocarbon into ethylene. In some embodiments, the cracker includes a dehydrogenator for removing hydrogen, thereby obtaining an unsaturated C=C bond.

In some embodiments, the flow of ethylene to the plant is lower during the partial shutdown phase than during the operational polymerization phase and the relation of $FR_E^1$, which is the flow rate of ethylene supplied to the plant during the polymerization phase, and $FR_E^2$, which is the flow rate of ethylene supplied to the plant during the partial shutdown phase, is $FR_E^2 \leq 0.1*FR_E^1$; alternatively $FR_E^2 \leq 0.05*FR_E^1$; alternatively $FR_E^2 \leq 0.01*FR_E^1$. In some embodiments, no ethylene flows into the plant during the partial shutdown phase. In some embodiments, the flow of comonomer to the reactor is lower during the partial shutdown phase than during the operational polymerization phase. In some embodiments, no comonomer is supplied to the reactor during the partial shutdown phase.

In some embodiments, the flow of initiator to the reactor is lower during the partial shutdown phase than during the operational polymerization phase and the relation of $FR_{in}^1$, which is the flow rate of the one or more initiators fed to the plant during the polymerization phase, and $FR_{in}^2$, which is the flow rate of the one or more initiators fed to the plant during the partial shutdown phase, is $FR_{in}^2 \leq 0.1*FR_{in}^1$; alternatively $FR_{in}^2 \leq 0.05*FR_{in}^1$; alternatively $FR_{in}^2 \leq 0.01*FR_{in}^1$. In some embodiments, no initiator is fed into the plant during the partial shutdown phase.

In some embodiments, a compressor operates during the partial shutdown phase. In some embodiments, the compressor in fluid connection with the reactor (referred to above as the "secondary" compressor) operates during the partial shutdown. In some embodiments, a compressor situated in fluid communication with the inlet of the secondary compressor (referred to above as the "primary" compressor) operates during the partial shutdown phase. In some embodiments, the primary compressor is operating in idle mode during the partial shutdown, wherein the flow of fluid through the primary compressor during the partial shutdown phase is lower than that during the operational polymerization phase.

In some embodiments, the plant includes a product outlet valve, being located between the inlet side of the recycle connection and the product output of the plant, wherein the valve is more open during the polymerization phase than during the partial shutdown phase. In some embodiments, the cross sectional area of the opening in the valve during the partial shutdown phase is less than the cross sectional area of the opening in the valve during the polymerization phase. In some embodiments, the cross sectional area of the opening in the valve during the partial shutdown phase is less than about 50%, alternatively less than about 10%, alternatively less than about 2% of the opening in the valve during the polymerization phase. In some embodiments, the product outlet valve is fully closed during the partial shutdown phase.

For exiting from the partial shutdown phase and re-entering the polymerization phase, the pressure in the reactor is increased from the pressure of $p_r^2$ to a pressure of $p_r^3$, wherein the relation of $p_r^2$ and $p_r^3$ is $p_r^3 \geq 1.1 * p_r^2$, alternatively $p_r^3 \geq 1.15 * p_r^2$; alternatively $p_r^3 \geq 1.2 * p_r^2$. In some embodiments, during the pressure increasing step (iii), first the pressure within the reactor is increased and then the flow rate of the one or more initiators fed to the plant is raised from $FR_{in}^2$ to a higher flow rate. In some embodiments, the initiator is introduced into the reactor at more than one position of the reactor and the increase of the flow rate of the one or more initiators is not carried out at every position at the same time but subsequently for the individual positions. In some embodiments, as the flow rate of the one or more initiators to the reactor increases, the flow rate of ethylene supplied to the plant rises.

FIG. 1 shows a schematic of a plant 100 according to an embodiment of the present disclosure. Polymerization is carried out in a tubular reactor 30. Ethylene 10 and optional chain transfer agents 17 are combined as a fluid and introduced through a primary compressor 20, combined with optional comonomers 12 through a secondary compressor 22, and a pre-heater 25 through the inlet 29 of the reactor 30 into reactor 30. Initiator 15 is introduced into reactor 30 at four positions.

After the reactor 30, the fluid passes from the reactor's outlet 31 through a high pressure let down valve 35 and a post reactor cooler 38 into a high-pressure separator 40 in which a separation into a gaseous composition and a liquid composition occurs.

Liquid products from the high-pressure separator 40 pass through a valve 42 to a low-pressure separator 45 for further separation into a gaseous composition and a liquid. Liquid products from the low-pressure separator 45 pass to a pelletizer 50 which outputs solid pellets of product 52.

A high-pressure recycle connection 60 provides a fluid connection between the reactor's outlet 31 and inlet 29. The high-pressure recycle connection 60 includes one or more coolers 62 and a one or more separators 63.

In some embodiments, the high-pressure recycle connection 60 is in fluid communication with a receiver 70 such as a flare or a cracker via a pressure-operated valve 65. Fluid communication between the high-pressure recycle connection 60 and the receiver 70 is established above a set pressure in the recycle connection 60.

A low-pressure recycle connection 80 also provides a fluid connection between the reactor's outlet 31 and inlet 29. The low-pressure recycle connection 80 includes one or more coolers 82 and a one or more separators 83.

Figure 2:
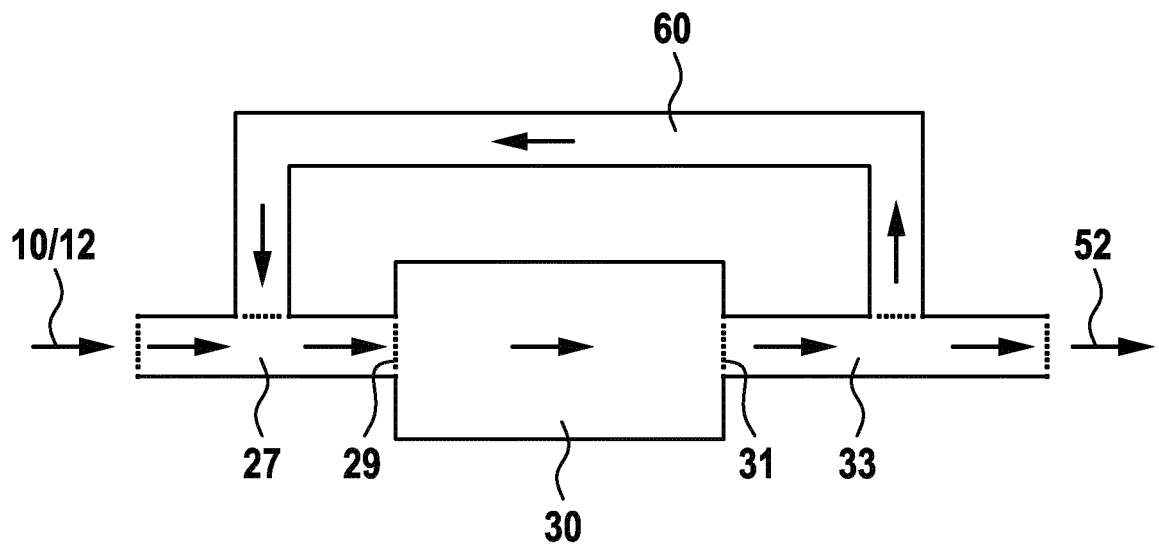
FIG. 2 is a schematic showing an embodiment of the flow of fluids through a plant during the polymerization phase.

FIG. 2 is a schematic showing of the flow of fluids through a plant during the polymerization phase. Ethylene 10 and optional comonomers 12 enter as fluid into the reactor inlet side of the plant 27 and flow through reactor inlet 29 into reactor 30. The fluid exits reactor 30 though reactor outlet 31 and flows into the reactor outlet side of the plant 33 in which the fluid is separated into (i) product 52 which exits the plant and (ii) residual fluid for recycle which flows into the recycle connection 60. After passing through the recycle connection 60, the fluid passes again to the inlet side of the plant 27 for reentry into the reactor 30. A single recycle connection 60 is shown in FIG. 2. In some embodiments, the plant is configured with one or more further recycle connection(s) 80 in parallel with the recycle connection 60, each allowing fluid flow from the reactor outlet side of the plant 33 to the reactor inlet side of the plant 27.

Figure 3:
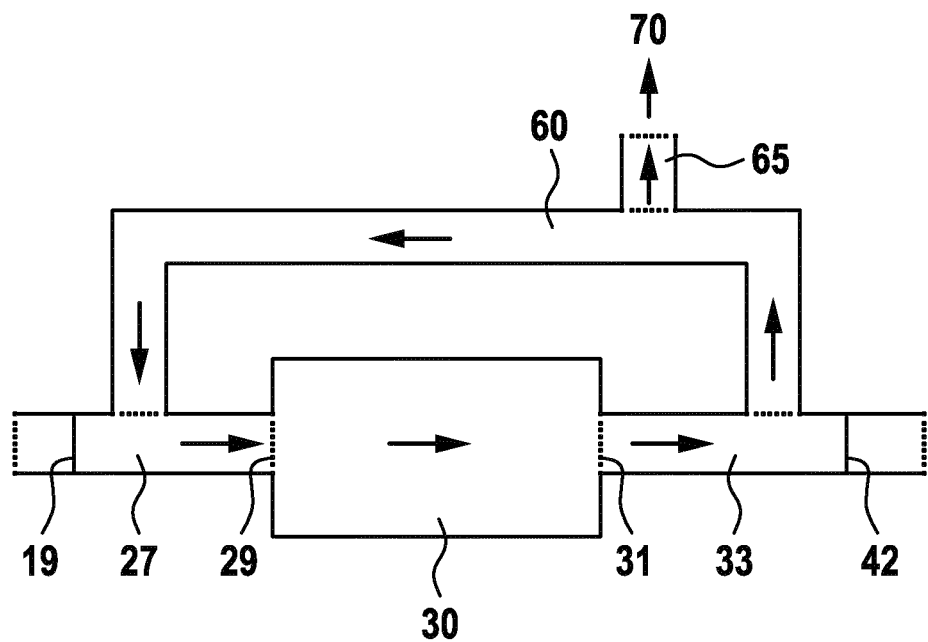
FIG. 3 is a schematic showing an embodiment of the flow of fluids through a plant during the partial shutdown phase.

FIG. 3 is a schematic showing of the flow of fluids through a plant during the partial shutdown phase. During the partial shutdown phase, little or no reactant material enters the plant and little or no product material exits the plant. Material is prevented from entering to the plant by closing valves 19 on the rector inlet side of the plant and from exiting the plant by closing valves 42 on the reactor outlet side of the plant. Fluid enters the reactor 30 through reactor inlet 29 after having passed components situated on the reactor inlet side of the plant 27. Fluid exits the reactor 30 though reactor outlet 31 and passes through components situated on the reactor outlet side of the plant 33 before entering the recycle connection 60. The fluid passes through the recycle connection 60 to return to the reactor inlet side of the plant 27. Some of the fluid exits the recycle connection 60 via an open valve 65 to a receiver 70 rather than returning to the reactor inlet side of the plant 27.

In a general embodiment, the process for the preparation of a downstream product includes the following preparation steps:

(a) preparing an ethylene-based polymer by a polymerization process; and (b) treating the ethylene-based polymer to obtain the downstream polymer.

In a general embodiment, the obtained ethylene-based polymer or the downstream product is converted into a shaped body.

In a general embodiment, a plant for polymerization including:

A. a reactor having a reactor inlet and a reactor outlet;
B. a recycle connection positioned in fluid communication between the reactor outlet and the reactor inlet; and
C. a valve in fluid communication with the recycle connection or a component situated between the reactor outlet and the inlet of the recycle connection, and when being in an open position, the valve provides fluid communication to a receiver;

wherein the valve is configured to move to an open position as the pressure in the recycle connection exceeds a set pressure. In some embodiments, the receiver is a flare, a cracker, or both.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

Example 1

A polymerization reaction was carried out in a plant according to FIG. 1. The operating pressure in the reactor $P_r^1$ was 300 MPa.

The reactor was put into a partial shutdown phase by increasing the rate of flow of fluid from the reactor into the high pressure recycle connection 60 to achieve a reactor pressure profile as depicted in FIG. 4. The flows into the plant of ethylene, initiator, and comonomer were reduced to zero. About 10 wt. % of the contents of the reactor flowed to the flare and cracker 70 via the pressure-operated valve 65.

The plant was then restored to a polymerization phase by decreasing the rate of flow of fluid from the reactor into the high-pressure recycle connection 60 and increasing the flows into the plant of ethylene, initiator, comonomer and modifier to operational values.

Comparative Example A

A polymerization reaction was carried out in a plant according to FIG. 1. The operating pressure in the reactor was 300 MPa.

The reactor was shut down by depressurizing the reactor via a blow down to the environment. About 70 wt. % of the contents of the reactor passed through the blow down to the environment. The flows into the plant of ethylene, initiator, co-polymer and modifier to the plant were reduced to zero.

The reactor was then cleaned, and the operational process was restarted.

TABLE 1

| Example | Material efficiency | Energy efficiency | Downtime | Environmental contamination |
|---------|---------------------|-------------------|----------|------------------------------|
| Example 1 | ++ | ++ | ++ | ++ |
| Comparative Example A | − | − | − | − |

Key:
++: very good,
−: poor

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A process for polymerizing ethylene, and optionally one or more comonomers, to obtain an ethylene-based polymer in a plant having a polymerization reactor, a reactor inlet side, a reactor outlet side, a recycle connection, a product output, and a flow of fluid from the reactor outlet side into the recycle connection and from the recycle connection to the reactor inlet side, comprising the steps of:
   (i) reacting ethylene, and optionally one or more comonomers, to obtain the ethylene-based polymer at an operating pressure in the reactor $p_r^1$ and an operating pressure in the recycle connection $p_c^1$ during a polymerization phase;
   (ii) reducing the pressure in the reactor from the pressure of $p_r^1$ to a pressure of $p_r^2$ by increasing a flow rate of fluid from the reactor outlet side of the plant into the recycle connection, wherein the relation of $p_r^1$ and $p_r^2$ is $p_r^2 \leq 0.85 * p_r^1$ for entering into a partial shutdown phase; and
   (iii) increasing the pressure in the reactor from the pressure of $p_r^2$ to a pressure of $p_r^3$, wherein the relation of $p_r^2$ and $p_r^3$ is $p_r^3 \geq 1.1 * p_r^2$ for exiting from the partial shutdown phase and re-entering the polymerization phase
   wherein (a) the polymerization reactor has a reactor inlet and a reactor outlet, (b) the reactor inlet side is located upstream of the reactor inlet, (c) the reactor outlet side is located downstream of the reactor outlet, and (d) the recycle connection has an inlet in fluid communication with the reactor outlet side of the plant and an outlet in fluid communication with the reactor inlet side of the plant,
   wherein the plant has:
   e) a valve located in the recycle connection, or in a component situated in fluid communication between the reactor outlet side and the inlet of the recycle connection, wherein the valve has a closed position and an open position;
   (f) a receiver for receiving fluid from the recycle connection through the valve when the valve is in the open position, and
   wherein the valve moves from the closed position to the open position as the pressure in the recycle connection exceeds a set pressure $p_c^2$, wherein the relation of $p_c^1$ and $p_c^2$ is $p_c^1 < p_c^2 \leq 1.5 * p_c^1$; and
   the valve moves from the open position to the closed position as the pressure in the recycle connection decreases below a reset pressure $p_c^3$, wherein the relation of $p_c^1$ and $p_c^3$ is $0.7 * p_c^3 \leq p_c^1$.

2. The process according to claim 1, wherein the operating pressure $p_r^1$ in the reactor is in a range from about 100 to about 400 MPa.

3. The process according to claim 1, wherein the operating pressure in the recycle connection $p_c^1$ is in a range from about 15 to about 50 MPa.

4. The process according to claim 1, wherein the reducing step (ii) occurs in a time period of from about 5 seconds to about 15 minutes.

5. The process according to claim 1, wherein the reducing step (ii) is initiated in response to an event selected from the group consisting of:
   (a) a temperature in the plant exceeding a threshold value;
   (b) a pressure in the plant exceeding a threshold value; and
   (c) a malfunction of a component in the plant.

6. The process according to claim 1, wherein the receiver is a flare or a cracker or both.

7. The process according to claim 1, wherein the plant has a product outlet valve located between the inlet side of the recycle connection and the product output of the plant, wherein the valve is more open during the polymerization phase than during the partial shutdown phase.

8. The process according to claim 1, wherein the plant has:
   (g) a compressor located in fluid communication between the outlet of the recycle connection and the reactor inlet.

9. The process of claim 8, wherein the compressor is operated during the partial shutdown phase.

10. A process for the preparation of a downstream product comprising the following steps:
    (a) preparing an ethylene-based polymer by a process according to claim 1; and
    (b) treating the ethylene-based polymer to obtain the downstream product.

11. The process according to claim 1, wherein the obtained ethylene-based polymer or a downstream product is converted into a shaped body.

12. A process for polymerizing ethylene, and optionally one or more comonomers, to obtain an ethylene-based polymer in a plant having a polymerization reactor, a reactor inlet side, a reactor outlet side, a recycle connection, a product output, and a flow of fluid from the reactor outlet side into the recycle connection and from the recycle connection to the reactor inlet side, comprising the steps of:
  (i) reacting ethylene, and optionally one or more comonomers, to obtain the ethylene-based polymer at an operating pressure in the reactor $p_r^1$ and an operating pressure in the recycle connection $p_c^1$ during a polymerization phase;
  (ii) reducing the pressure in the reactor from the pressure of $p_r^1$ to a pressure of $p_r^2$ by increasing the flow rate of fluid from the reactor outlet side of the plant into the recycle connection, wherein the relation of $p_r^1$ and $p_r^2$ is $p_r^2 \leq 0.85 * p_r^1$ for entering into a partial shutdown phase; and
  (iii) increasing the pressure in the reactor from the pressure of $p_r^2$ to a pressure of $p_r^3$, wherein the relation of $p_r^2$ and $p_r^3$ is $p_r^3 \geq 1.1 * p_r^2$ for exiting from the partial shutdown phase and re-entering the polymerization phase
  wherein (a) the polymerization reactor has a reactor inlet and a reactor outlet, (b) the reactor inlet side is located upstream of the reactor inlet, (c) the reactor outlet side is located downstream of the reactor outlet, and (d) the recycle connection has an inlet in fluid communication with the reactor outlet side of the plant and an outlet in fluid communication with the reactor inlet side of the plant,
  wherein, during the polymerization phase, ethylene is supplied to the plant with a flow rate $FR_E^1$ and, during the partial shutdown phase, ethylene is supplied to the plant with a flow rate $FR_E^2$, wherein the relation of $FR_E^1$ and $FR_E^2$ is $FR_E^2 \leq 0.1 * FR_E^1$.

13. A process for polymerizing ethylene, and optionally one or more comonomers, to obtain an ethylene-based polymer in a plant having a polymerization reactor, a reactor inlet side, a reactor outlet side, a recycle connection, a product output, and a flow of fluid from the reactor outlet side into the recycle connection and from the recycle connection to the reactor inlet side, comprising the steps of:
  (i) reacting ethylene, and optionally one or more comonomers, to obtain the ethylene-based polymer at an operating pressure in the reactor $p_r^1$ and an operating pressure in the recycle connection $p_c^1$ during a polymerization phase;
  (ii) reducing the pressure in the reactor from the pressure of $p_r^1$ to a pressure of $p_r^2$ by increasing the flow rate of fluid from the reactor outlet side of the plant into the recycle connection, wherein the relation of $p_r^2$ and $p_r^3$ is $p_r^3 \geq 0.85 * p_r^1$ for entering into a partial shutdown phase; and
  (iii) increasing the pressure in the reactor from the pressure of $p_r^2$ to a pressure of $p_r^3$, wherein the relation of $p_r^2$ and $p_r^3$ is $p_r^3 \geq 1.1 * p_r^2$ for exiting from the partial shutdown phase and re-entering the polymerization phase
  wherein (a) the polymerization reactor has a reactor inlet and a reactor outlet, (b) the reactor inlet side is located upstream of the reactor inlet, (c) the reactor outlet side is located downstream of the reactor outlet, and (d) the recycle connection has an inlet in fluid communication with the reactor outlet side of the plant and an outlet in fluid communication with the reactor inlet side of the plant,
  wherein an initiator is fed into the reactor and wherein, during the polymerization phase, the initiator is fed with a flow rate $FR_{in}^1$; and, during the partial shutdown phase, the initiator is fed with a flow rate $FR_{in}^2$, wherein the relation of $FR_{in}^1$ and $FR_{in}^2$ is $FR_{in}^2 \leq 0.10 * FR_{in}^1$.

* * * * *

UNITED STATES PATENT AND TRADEMARK OFFICE
CERTIFICATE OF CORRECTION

PATENT NO. : 10,626,195 B2
APPLICATION NO. : 15/776379
DATED : April 21, 2020
INVENTOR(S) : Neumann et al.

It is certified that error appears in the above-identified patent and that said Letters Patent is hereby corrected as shown below:

On the Title Page

Column 1, Item (30), Line 1, "15195082" and insert -- 15195082.1 --, therefor

In the Specification

In Column 1, Line 3, after "POLYMERIZATION PROCESS WITH A PARTIAL SHUTDOWN PHASE" insert -- This application is the U.S. National Phase of PCT International Application PCT/EP2016/077813, filed November 16, 2016, claiming benefit of priority to European Patent Application No. 15195082.1, filed November 18, 2015, the disclosures of which are incorporated herein by reference in their entirety. --

In the Claims

In Column 16, Claim 1, Line 29, delete "$p_c^3$ is $0.7 * p_c^3 \leq p_c^1$" and insert
-- $p_c^3$ is $0.7 * p_c^1 < p_c^3 \leq p_c^1$ --, therefor In Column 18, Claim 13, Line 15, delete "$p_r^2$ and $p_r^3$ is $p_{r3} \geq 0.85 * p_r^1$" and insert -- $p_r^1$ and $p_r^2$ is $p_r^2 \leq 0.85 * p_r^1$ --, therefor Signed and Sealed this
Third Day of January, 2023

Katherine Kelly Vidal
*Director of the United States Patent and Trademark Office*